United States Patent [19]

Fiedler

[11] Patent Number: 5,349,749
[45] Date of Patent: Sep. 27, 1994

[54] PROCESS FOR FORMING A MONOLITHIC COMPOSITE PLATE

[76] Inventor: Leslie C. Fiedler, 553 N. Mission Dr., San Gabriel, Calif. 91775

[21] Appl. No.: 936,766

[22] Filed: Aug. 27, 1992

[51] Int. Cl.$^5$ .......................... B65D 19/26; B31F 1/20
[52] U.S. Cl. ...................... 29/897; 29/527.1; 29/530; 156/79; 156/210; 156/292; 52/799; 108/901
[58] Field of Search ...................... 29/460, 897, 897.32, 29/897.35, 458, 527.1, 530, 772; 264/46.5, 275, 277; 156/79, 210, 292; 52/799; 108/51.1, 901

[56] References Cited

U.S. PATENT DOCUMENTS

| | | | |
|---|---|---|---|
| 2,744,042 | 5/1956 | Pace | 29/897.32 |
| 3,719,157 | 3/1973 | Arcocha et al. | 108/51.1 |
| 4,159,681 | 7/1979 | Vandament | 108/51.1 |
| 4,220,100 | 9/1980 | Palomo et al. | 108/51.1 |
| 4,416,715 | 11/1983 | Schramm et al. | 156/210 |
| 4,593,449 | 6/1986 | Meray-Hovarth et al. | 29/527.1 |
| 4,615,166 | 10/1986 | Head | 52/799 |
| 5,042,397 | 8/1991 | Fiedler | 108/51.1 |
| 5,050,506 | 9/1991 | Fiedler | 108/51.1 |

Primary Examiner—Mark Rosenbaum
Assistant Examiner—David P. Bryant
Attorney, Agent, or Firm—Donald D. Mon

[57] ABSTRACT

A method for forming a monolithic composite slat for a lightweight pallet. The slat is formed by adhering the crests of a corrugation to one side of a reinforcement sheet, placing another side of the reinforcement sheet in spaced, parallel relation with the corrugation and the first side such that the corrugation is situated between the first and second sides, inserting a flexible fiber in each trough of the corrugation and using each fiber to urge the trough toward the second side, inserting foam-forming material between the first and second sides, and allowing the material to cure, thereby forming a solid, foam-filled slat. The method is advantageous over that of the prior art, as it ensures that the corrugation remains in place during inserting of the foam-forming material.

4 Claims, 1 Drawing Sheet

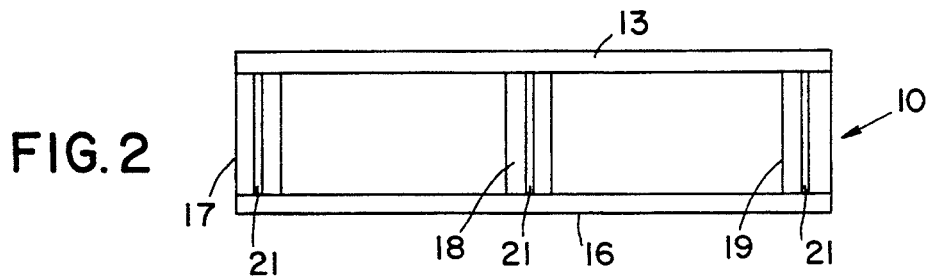
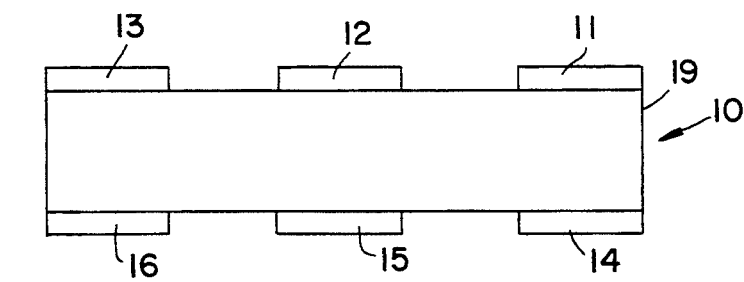
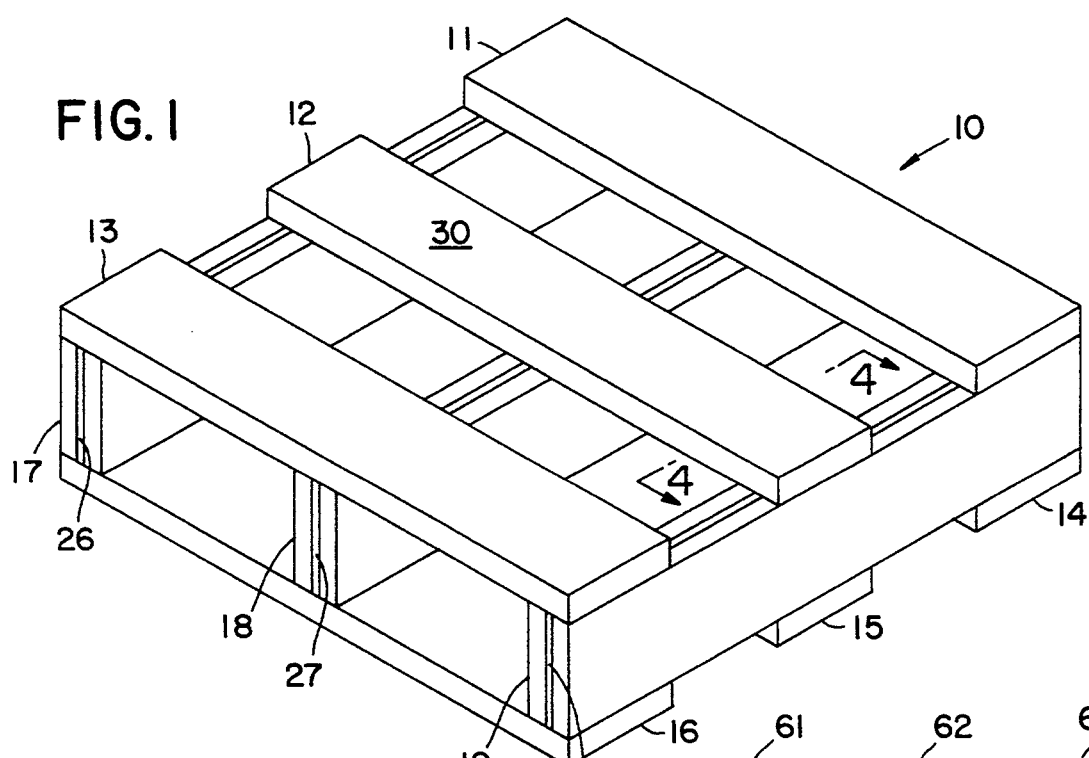
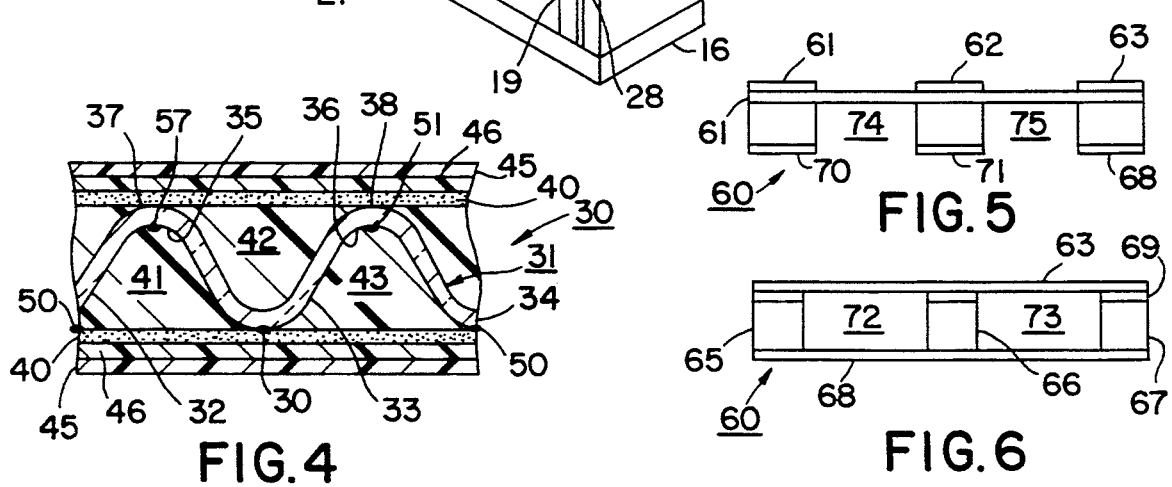
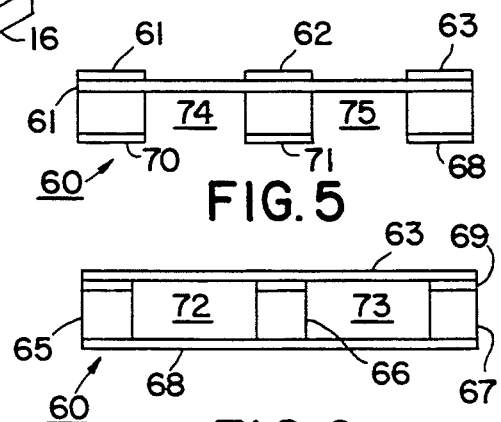

5,349,749

PROCESS FOR FORMING A MONOLITHIC COMPOSITE PLATE

FIELD OF THE INVENTION

This invention relates to lightweight pallets for the support of articles, for example for forklift pallets.

BACKGROUND OF THE INVENTION

Pallets of the type shown in Fielder U.S. Pat. No. 5,042,397 have increased in popularity, as the consequences of the use of conventional forklift pallets have become evident, especially those related to those which use wood in their construction. The use of wood inherently involves the cutting down of trees.

It is a fact that in the United States, the amount of wood consumed annually for making forklift pallets is second only to the amount of wood used in the paper industry. As another example, in Costa Rica, an astonishing 28% of the wood presently being cut down from its virgin forests is used for pallets. Many of these pallets will be used only for a one way trip, because it is too costly to ship them back.

These consequences are long term. To some extent they can be alleviated by advanced foresting practices, but the destruction of a virgin forest, together with its ecological systems, is a serious price to pay for the shipping of products. There are other concerns of greater immediacy, especially in direct cost where shipments are measured by weight, and in public health.

Pallets are exposed to all kinds of environments and pollutants. They are often placed on the ground near animals and other sources of pollution. They are porous, and can be saturated with water. This water will bring weight with it, which when weight is an economical determinant, will limit the amount of product that can be transported in a weight limited shipment, or which can increase the shipping costs when the shipment is costed out as a function of weight. This is perhaps the best understood consequence of the use of porous materials for pallets.

However, also the water constitutes a suitable medium to support living organisms. Outbreaks of diseases such as cholerea have been traced to forklift pallets. These pallets often rest atop stored loads, and the pollutants are frequently transferred from the pallets to their loads, and then to whomever handles the products. Because wooden pallets can not effectively be sterilized, they represent a serious risk, whose extent has only recently begun to be appreciated.

The pallet shown in the Fiedler patent is lightweight, non-absorbtive, readily cleaned and sterilized. It is strong enough for applications comparable to those for which wood pallets are use, with nearly identical dimensions.

The instant invention is one improvement over the Fiedler patent. The Fielder patent is incorporated herein in its entirety by reference for its showing of such a pallet, of suitable materials of construction, and of methods for making it.

In the course of preparing to manufacture Fielder-type pallets on a high-rate production basis, problems and opportunities for improvement in the process and in the product have become apparent. It is an object of this invention to disclose and to claim these.

This product is substantially entirely made of organic plastic material. It includes a reinforcement element and a cover which are flexible prior to incorporation in the pallet, and a foam which hardens the assembly. It is best practice to make all elements from the lengths of the same composite construction, cut to length and bonded together.

In the course of manufacture, there are significant lengths of time when nothing is rigid except the mold which contains the materials that are to form the basic structural material. As a consequence, there is considerable difficulty inherent in holding the elements of the slats in place while the foam is injected and cured, in a continuous process. One could readily jig up the flexible components and make the slats one by one. It such an event, the pallet would cost too much even to be considered, no matter what are its advantages.

This invention provides a slat construction which includes a skin, an internal corrugation, and a buttressing foam that fills in the spaces between the corrugation and the skin. This slat is amenable to manufacture to sufficiently close dimensions in a continuous flow production system.

BRIEF DESCRIPTION OF THE INVENTION

This invention is a pallet having a platform formed as a plurality of parallel slats, attached to a plurality of runners on their bottom faces. Although the platform and runners could be made of different materials, best advantage is attained if all are made of the same composite material. For example, it makes little sense to have composite slats and wooden runners.

The plate from which the slats and runners are preferably formed is a corrugation of material which when side-supported provides suitable columnar strength to resist crushing. Buttress material fills in the corrugations to provide side support and at least some columnar strength. This supported corrugation is overlaid top and bottom with a reinforcement sheet of material having tensile properties to resist bending. A protective skin is formed over this sheet.

The sheet, buttressed material, and the corrugation are bonded into a continuous structure. A bonded together continuous structure such as this is sometimes referred to as a "monolithic composite".

When subjected to bending forces, the composite functions best when the linear axis of the corrugations is in the bending plane. Frequently it will be advantageous to reinforce the lower surface side, which will be convex, with reinforcement material to withstand tensile forces that could crack the bottom of the structure. As a practical matter, the reinforcement material when used will be applied to both sides so that either side may be made the top or bottom. Strands such as glass fibers may for this purpose be incorporated onto the composite. These have no function to provide compressive strength but primarily they improve resistance to bending. These are optional. In addition to the strands in this in this alignment, cross strands can be provided, which can be laid in place or woven together as a cloth.

The bonded joinder of this assembly may consist of adhesive bonds at the various interfaces. Preferably the materials will be porous so that the bonding material can penetrate the entire structure. The preferred embodiment is a structural foam used as the buttressing material which penetrates or envelops the other members. This is a light-weight arrangement, and can be self-skinning as well.

According to a preferred but optional feature of this invention, in the process of making the plate, at least one set of crests of the corrugation is attached to the wrapper sheet so as to position the material of the corrugation so that when the foam buttress material is applied, the corrugation is moved toward its intended configuration.

According to yet another preferred but optional feature of this invention, the crests which are not attached to the wrapper can be raised to their intended position by flexible strands held in tension.

According to yet another preferred but optional feature of this invention, both the slats and the runners are made from plates with identical lateral cross-sections, whereby the same tooling set up can make all of the composites of the pallet.

The above and other features of this invention will be fully understood from the following detailed description and the accompanying drawings, in which:

BRIEF DESCRIPTION OF THE DRAWINGS

FIG. 1 is a perspective view of the presently preferred embodiment of the invention;

FIG. 2 is a side view of FIG. 1, looking up from the left;

FIG. 3 is a side view of FIG. 1 looking up from the right

FIG. 4 is a cross-section taken at line 4—4 of FIG. 1;

FIG. 5 is a side view of another embodiment; and

FIG. 6 is a right hand end view of FIG. 5

DETAILED DESCRIPTION OF THE INVENTION

FIG. 1 shows a pallet 10 according to the invention. It is shown with three top slats 11, 12, 13 and three bottom slats 14, 15 and 16. Three runners 17, 18 and 19 are shown interconnecting the top and bottom slats.

The slats and runners are preferrably all made from the same plate 30 shown in FIG. 4. The top and bottom slats are all made of single plates. The runners are formed from two such plates, with a layer 21 of adhesive joining them (FIG. 2).

This arrangement constitutes an important economic advantage in the manufacture of the pallet. The machinery to make the plates should operate continuously, and produce an indefinite length of the plate material, which is then cut to length. Such machinery is adjusted while running, and while running correctly it is left in operation without shutting it down. It is an advantage to require as few such machines as possible, and not to have to shut down to prepare for manufacture of a different size.

For example, for forklift pallets, and pallets generally, a cross-section of about ¾ inch of thickness by four inches of width is very satisfactory. The spacing apart of the slats depends on the type of loads to be supported. Generally a spacing of less than about 2 inches between them is desired for the top slats, although this can vary widely.

It is not necessary to provide bottom slats. Instead, if the runners are sufficiently stable, as they often will be, they can rest directly on the ground.

However, there are advantages in providing both top and bottom slats. For example, when equal numbers of slats are used, either top or bottom slats can be the uppermost. The terms "top" and "bottom" are used herein for convenience referring to both the plates, the slats and the runners, rather than to describe which is necessarily the uppermost. Also, the additional side support given to the runners by the bottom slats makes the runners more resistant to side sway.

The runners usually can not be formed from only one piece of the same plate material as is used for the slots, because of their need for thickness to resist side sway. In order to use the same plates throughout the pallet, a plurality of them is joined by adhesive bonds to form a thicker, wider runner. Then this thicker runner is bonded to the slats by adhesive bonds 26, 27, 28.

This invention also comprehends the use of runners which are formed to different, usually larger, cross-sections than the slats. Many of the advantages of this invention would still be enjoyed, although the cost savings from using only a single plate cross-section will be forfeited.

In the Figs, a three by three arrangement of slats and runners is shown. Different numbers of each can of course be provided. Also, the top and bottom slats need not be equal in number.

In the manufacture of an economically optimized pallet, the use of materials which are already available in large quantities is advantageous. One such product may be used for certain layers and for the corrugation. This material is a resin-bonded sheet of randomly-laid glass fibers commonly used in the roofing trades. It is porous, with glass strands about 1 inch long. It weighs about 4.0 pounds per hundred square feet. It has a minor tensile strength, about 30 pounds per inch, which is useful but sometimes not enough, and excellent columnar properties when side supported. It is commercially available from Conglas, Inc. of Bakersfield, Calif. under the mark "CONGLAS".

Reinforcing glass fibers, usually about 16 microns in diameter, are useful for their tensile properties. These fibers are attainable from a wide variety of commercially available sources.

It is most convenient to form this composite in a continuous process rather than to make sub-parts and then bond them together. Accordingly, the use of a single plastic material for filling and bonding is to be preferred. The outside surfaces must resist at least minor abrasion, so a skin must be provided. The use of a self skinning plastic material is preferred because it requires one less manufacturing step.

Plate 30, from which all of the slats and runners are made in the preferred embodiment, is best shown in FIG. 4. It has a central corrugation 31 with an undulating cross-section as shown. It has crests 32, 33, 34 that form troughs 35, 36 between them.

A reinforcement sheet 40 wraps around the corrugation. Buttresses 41, 42, 43 fill in the troughs.

It will be appreciated that crests 32, 33, and 34 are at one side of the corrugation. Crests 37 and 38 are at the other side. Troughs are formed between adjacent crests at either side, and buttresses fill all of the troughs.

The reinforcement sheet may conveniently be a single piece wrapped around the corrugation. Optionally, it could be provided in two or more joined pieces. Either way, the reinforcement sheet encloses the corrugation and buttresses.

A skin layer 45 encloses the reinforcement sheet and provides a tough abrasion resistant surface for the slats and runners.

In order to improve the bending properties when the plate is used for the slats, additional fibers 46 can be laid onto the surface of the reinforcement sheet. These are intended to be laid along the long axis of the plate, but may be provided as part of a woven cloth as shown, or even as a randomly laid layer. Glass fibers and glass cloth are useful for this purpose.

FIG. 4 shows an idealized showing of the plate material. The process of making this plate starts with flexible materials to be spaced apart and bonded together by a foam in a continuous, heated, process. While very precise orientation cannot be expected, still there must be produced a plate which will have the strength needed to resist bending and compressive loads exerted on it, and this requires at least some correspondence to this idealized shape.

For the slats, the compressive loads (vertical in FIG. 4) is provided by the combination of the foam's inherent crush resistance, assisted by the reinforcement of the corrugation, which when bonded in place resists the load by retaining its shape. Bending forces are resisted by the reinforced corrugations, assisted by the additional fibers 46 when used.

For the runners, the load is a compressive one, which is sideward in FIG. 4, because the runners are on their edge, with the corrugations extending horizontally. Again, the resistance to this load is by the combination of the foam's inherent crush resistance and the resistance of the buttressed corrugation to a change in its shape. Also, any tendency for the slat to "barrel" out at its midpoint is resisted by the reinforcement sheet which is bonded to the buttresses and at some places to the corrugation itself. In the preferred construction all of the crests would directly abut a reinforcement sheet, but in a practical plate, at least some crests will usually be bonded to the reinforcement sheet only through the foam.

In any event, it is desirable to have the corrugations formed with corrugations whose crests are at regular intervals so as at least closely to approach the reinforcement sheet.

In the process of making this plate, the corrugation material is pleated to form the crests and troughs, and is fed into the machinery lengthwise. The reinforcement sheet is folded and fed into the machine, and plastic to form the foam is injected between the corrugation material and the reinforcement sheet. As the foam expands, it moves the reinforcement sheet against the wall of a mold and fills in the troughs. When the foam has cured, the plate material leaves the mold.

So as to provide orderliness to the corrugations, at least one set of adjacent crests 32, 33, and 34, for example the crests facing the lower surface are adhered to the reinforcement sheet at bonds 50. This may be by such means as adhesive or heat welding. This is not intended to be a strong structural bond. It is only to position one set of crests so as to space them apart correctly. Then when the foam fills the troughs, the corrugation tends to approach its ideal configuration.

Optionally, or in addition, fiber strands 51, for example glass fibers, can be supported in the upper troughs to hold the other set of crests 37, 38 up towards the reinforcement sheet. These extend along the troughs and provide additional bending strength. In FIG. 1, the risers are shown with the plates on their edge. Should a bulkier riser be desired, it is equally possible to lay the plates on their sides and bond them together, or to cut them into shorter lengths and bond them together with the corrugations directed vertically. For some applications these other arrangements will be preferred.

For example, FIGS. 5 and 6 show a pallet 60 which which is stackable, nestable, and accessible from all sides.

Three top slats 61, 62, 63 are formed from one or more plate lengths, to which nine risers are bonded. Examples are risers 65, 66, and 67. A bottom bridge slat 68 extends across and is bonded to these risers. An upper bridge slat 69 extends normally to slat 68 between the top slats and the risers. These risers may be considered as short runners. They will preferably be formed as sandwiches of short lengths of plate bonded together. If it can be afforded then short lengths of single thickness, larger cross section plate may be provided. Ususally this will not be preferred.

Bottom slats 70 and 71 are bonded to the bottoms of groups of three each of risers, slats 68, 70 and 71 being parallel. This leaves channels 72 and 73 between rows of posts, closed at the bottoms but still open to a fork lift tongue.

However, as seen in FIG. 5, the bottoms of channels 74 and 75 are open.

The channels provide forklift access from both sides. Notice also that channels 74 and 75 will receive corresponding rows of risers when one pallet is inverted over another, thereby saving considerable space, and enabling the reuse of these pallets because they are now economical to ship as deadhead items.

FIGS. 5 and 6 also illustrate that the runners can be formed from plates on edge or as layers.

In the preferred mode of manufacture, any suitable blowable plastic may be used, preferably one which is self-skinning at its surface. Then when it penetrates the reinforcement sheet it can form the skin, and if the outer fibers are provided, can also bond them to the structure.

The manufacture of the plate is straightforward. The pleated corrugation material is fed into a chamber, one set of its crests being attached to the reinforcement sheet. When used, the support fibers are also present, and lift the other crest. Plastic material is fed into the region inside the reinforcement sheet, and foams in place, forcing the reinforcement sheet and corrugation toward their intended position. Curing heat is applied if necessary. After the foam has been set up, the plate material will exit the machine and be cut through.

This invention is not to be limited by the embodiments shown in the drawings and described in the description, which are given by way of example and not of limitation, but only in accordance with the scope of the appended claims.

I claim:

1. A process for forming a solid, monolithic composite structural plate, said plate when formed comprising a reinforcement sheet having first and second parallel, spaced-apart sides, a corrugation between said sides having alternating crests and troughs, each of said crests defining a void thereunder, and buttresses filling said troughs and said voids, said buttresses being bonded to said corrugation and said sheet, said process comprising:

adhering a sequence of said crests of said corrugation to said first side, the material of said corrugation being initially flexible;

placing said second side of said sheet in spaced-apart, parallel relation with said corrugation and said first side such that said corrugation is situated between said first and second sides;

inserting a flexible strand in each trough, and moving said strands to engage the corrugation material and move said troughs toward said second side;

placing an initially fluid, foam-forming material in said troughs and said voids; and curing said foam-forming material to form a solid foam buttress in each of said troughs and said voids, which bonds to said corrugation and to a respective side.

2. A process according to claim 1, in which said foam-forming material is placed in only some of said troughs and said voids, some of said foam-forming material passing through said corrugation material to fill adjacent troughs and voids.

3. A process according to claim 1, in which said strands move their respective troughs into contact with said second side.

4. A process according to claim 3, in which said foam-forming material is placed in only some of said troughs and said voids, some of said foam-forming material passing through said corrugation material to fill adjacent troughs and voids.

* * * * *